United States Patent
Wirz

(10) Patent No.: US 7,013,744 B2
(45) Date of Patent: Mar. 21, 2006

(54) TOOTH ALIGNING DEVICE FOR THE ALIGNING OF WORKPIECE WITH PRE-CUT TEETH ON GEAR FINISHING MACHINES

(75) Inventor: Walter Wirz, Pfäffikon (CH)

(73) Assignee: Reishauer AG, Wallisellen (CH)

( * ) Notice: Subject to any disclaimer, the term of this patent is extended or adjusted under 35 U.S.C. 154(b) by 10 days.

(21) Appl. No.: 10/697,977

(22) Filed: Oct. 31, 2003

(65) Prior Publication Data
US 2004/0099056 A1 May 27, 2004

(30) Foreign Application Priority Data
Nov. 26, 2002 (DE) .......................... 202 18 352 U

(51) Int. Cl.
G01B 5/24 (2006.01)
G01B 5/28 (2006.01)
B25J 9/04 (2006.01)

(52) U.S. Cl. .................. 73/866.5; 73/162; 901/16; 901/41; 901/44; 901/46

(58) Field of Classification Search ............. 73/162, 73/431, 866, 866.5; 7/167, 168; 409/204, 409/218, 235, 264, 286, 337, 338, 343; 901/2, 901/10, 14, 15, 16, 24, 28, 41, 44, 46, 47
See application file for complete search history.

(56) References Cited

U.S. PATENT DOCUMENTS 2,612,776 A * 10/1952 Klas ........................... 73/147
3,188,745 A * 6/1965 Gates et al. .............. 33/501.15
4,002,380 A * 1/1977 Bowen ........................ 384/567
4,437,635 A * 3/1984 Pham ....................... 248/124.1
4,703,443 A * 10/1987 Moriyasu ..................... 702/168
4,891,889 A * 1/1990 Tomelleri ..................... 33/503
5,361,627 A * 11/1994 Levesque ....................... 73/73

(Continued)

FOREIGN PATENT DOCUMENTS

DE 3310345 A1 * 9/1984

(Continued)

Primary Examiner—Hezron Williams
Assistant Examiner—David A. Rogers
(74) Attorney, Agent, or Firm—Browdy and Neimark, PLLC

(57) ABSTRACT

The invention concerns a device for the non-contact measurement of the position of the teeth (13) of a workpiece (14) with precut teeth on a gear finishing machine. The measuring probe, retractable from the measuring position into a position of rest protected against soiling, is arranged in a holder (5) for radial and axial adjustment relative to the workpiece, the said holder (5) being a kinematic member of a parallelogram linkage (A) and by means of a hydraulic, pneumatic or electromechanical swivel drive (11) is swivellable from stop to stop between measuring position and position of rest in a plane containing the workpiece axis, such that in the advancement action from the lower end position to the top end position motions of the measuring probe (1) tangential to the workpiece circumference are completely avoided. The parallelogram kinematics moreover afford adequate protection against swarf and grinding dust, and lends the device a high stiffness and reliability.

9 Claims, 1 Drawing Sheet

U.S. PATENT DOCUMENTS

| | | | | |
|---|---|---|---|---|
| 5,373,735 | A | * 12/1994 | Gutman | 73/162 |
| 5,392,644 | A | * 2/1995 | Frazier | 73/162 |
| 5,609,058 | A | * 3/1997 | Gnadt et al. | 73/162 |
| 5,987,591 | A | * 11/1999 | Jyumonji | 700/259 |
| 6,211,506 | B1 * | 4/2001 | Pryor et al. | 250/208.1 |
| 6,430,472 | B1 * | 8/2002 | Boillot et al. | 700/245 |
| 6,451,027 | B1 * | 9/2002 | Cooper et al. | 606/130 |
| 6,532,840 | B1 * | 3/2003 | Hatley et al. | 73/866.5 |
| 6,702,805 | B1 * | 3/2004 | Stuart | 606/1 |

FOREIGN PATENT DOCUMENTS

| | | | |
|---|---|---|---|
| JP | 09014937 | A * | 1/1997 |
| JP | 11309684 | A * | 11/1999 |
| WO | 9006213 | A1 * | 6/1990 |

* cited by examiner

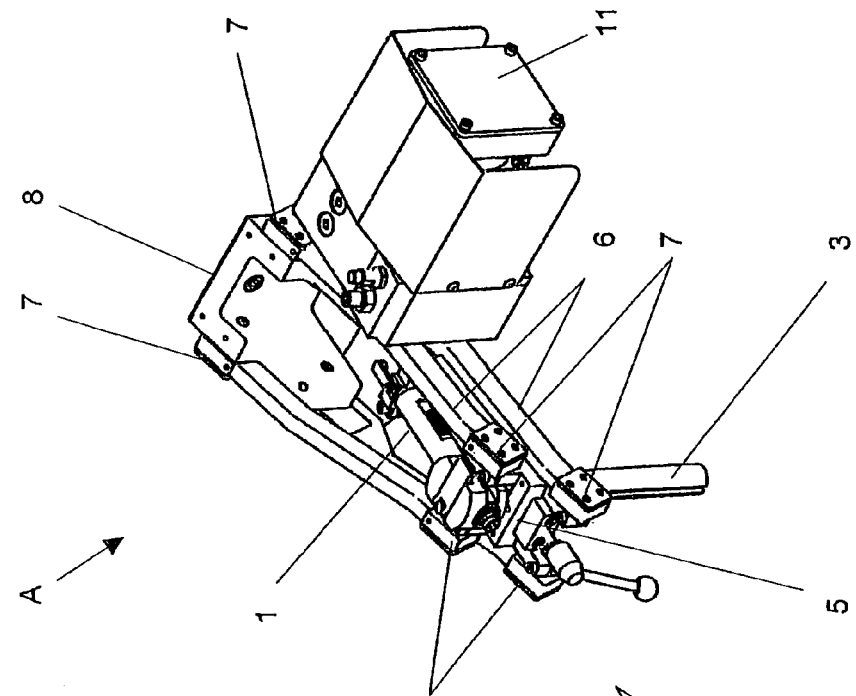
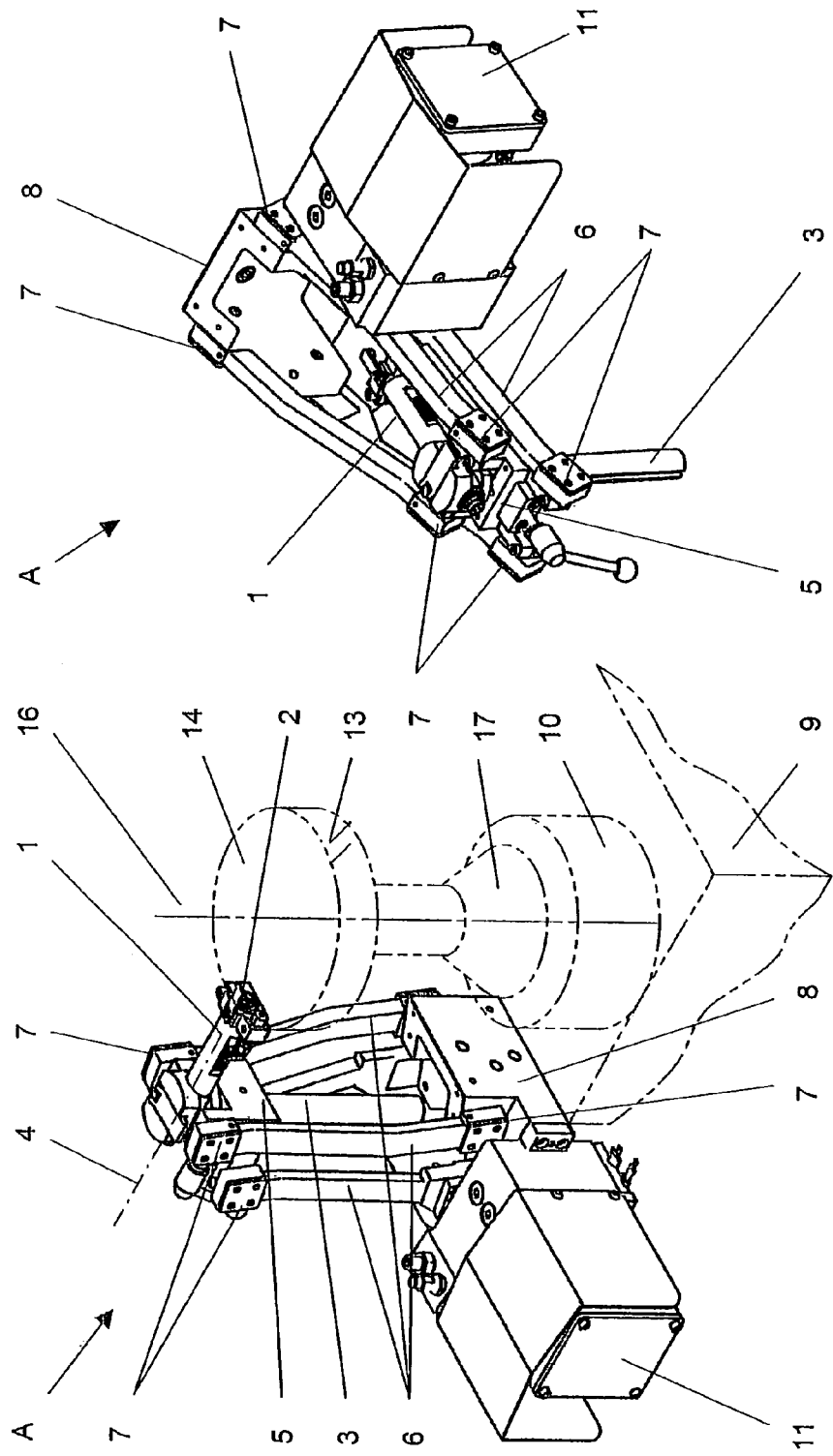

TOOTH ALIGNING DEVICE FOR THE ALIGNING OF WORKPIECE WITH PRE-CUT TEETH ON GEAR FINISHING MACHINES

TECHNICAL FIELD

The present invention concerns a device for the non-contact measurement of the position of the teeth on a pre-machined workpiece, which is set up for fine machining on the work spindle of a gear finishing machine.

BACKGROUND OF THE INVENTION

Increased demands on the running qualities of the gears in gear drives require more and more the precision finish machining of the gear teeth. In most cases the pre-machined workpieces are case-hardened, and then fine machined to the finished dimensions on all their functional surfaces. In this process the fine machining of the tooth flanks in particular is a complicated, resource consuming, and hence expensive operation. In the interests of economic manufacture, but also in order to avoid having to provide for unnecessarily large hardening depths and to balance and minimize the wear on the left and right flanks of the fine machining tool, it is therefore attempted to keep the material allowance for the fine machining as small as possible. For the fine machining of the teeth this means in practice that the depth of cut per flank for material removal is only a few hundredths to at most two tenths of a millimetre. If, as is generally the case, the left and the right flanks are machined in the same operation, this demands a very accurate alignment of the precut teeth relative to the fine machining tool, so that the latter can be brought exactly into the centre of the tooth spaces to be machined, in order to achieve uniform material removal from the left and right flanks of the workpiece.

Another requirement to be fulfilled by the aligning device is that it can be adapted to the relevant workpieces to be machined over a wide diameter range and axial position of the workpiece teeth to be measured.

Whereas for the alignment of the mutually related positions of tool and workpiece teeth to be machined the NC-axes available on the finishing machine are usually exploited, various methods are encountered in practice for the registering of the position of the precut workpiece teeth and the translation of the measured result into appropriate axis motion commands for the machine axes. In most cases, as also here in the present case, the angular position of the precut workpiece teeth is measured by means of a non-contact functioning measuring probe based on an inductive, optical or magnetic principle. Pre-requisite for an adequately exact and reliable measurement is that for the measurement the measuring probe is located near the outer contour of the teeth of the rotating workpiece in an exact tangential and axial position relative to the workpiece. During the subsequent machining of the workpiece, or whilst the work spindle is being loaded with a new workpiece, the measuring probe should, however, as far as possible be located outside the machining area at a point at which it is adequately protected against collision and soiling with swarf and grinding dust.

The solving of this seemingly trivial problem is not easy because, due to the short process times demanded, the measuring probe must be run to the measuring position at high speed and with high accuracy, must remain in position without vibrating during the measuring process, and then return just as quickly to its protected starting position.

With the known aligning devices with retractable measuring probe the probe is brought by means of a linear infeed or a swivel action about a fixed axis against a stop, or by means of a combination of both out of its position of rest into its measuring position, and from there back into its starting position. The motions are produced by hydraulic, pneumatic or electric motor drives.

Necessitated by the usually tight space conditions in the working area of the machine, solutions are often encountered in which by means of long projecting slender structural parts, long displacement strokes and wide swivel angles great spacial distances must be overcome. The results of this are mostly a modest stiffness of the measuring structure and a high proneness to vibration, as well as to functional disturbances, and accuracy loss due to soiling and wear under severe production conditions. The aligning errors caused by this lead to unequal material removal on the left and right flanks of the workpiece, and to rejects as soon as after finish machining—due to the small machining allowance—individual flanks are no longer machined over the entire flank surface.

SUMMARY OF THE INVENTION

It is an object of the present invention to provide an aligning device for aligning workpieces with pre-cut teeth on gear finishing machines by means of a non-contact functioning measuring probe, which device can be advanced from a position of rest to the measuring position, and which is of high static and dynamic stiffness and guarantees a high safety against functional disturbances and accuracy loss.

This is attained according to the invention device having the features stated in claim 1.

The device according to the invention possesses a measuring probe which is arranged on a holder constituting a kinematic member of a parallelogram linkage, the opposite member of which is connected rigidly with the machine column or the housing of the work spindle. The holder is displaceable by hydraulic or pneumatic means or by electric motor.

BRIEF DESCRIPTION OF THE DRAWINGS

In the following the invention is explained in detail by way of a preferred embodiment, which is illustrated in the annexed drawings. These depict:

FIG. 1 the diagrammatically represented view of an aligning device according to the invention, in measuring position, and FIG. 2 the device of FIG. 1 in position of rest viewed in a direction turned through 90° relative to the representation in FIG. 1

DETAILED DESCRIPTION OF A PREFERRED EMBODIMENT

FIG. 1 depicts the perspective side view of the aligning device according to the invention, in measuring position. A measuring probe 1, designed as a cylindrical rod with active end face 2, is arranged for axial displacement and clamping in a holder column 3, which is in turn arranged for displacement and clamping at right angles to the axis 4 of the measuring probe 1 in a holder 5. The holder 5 is a kinematic member of in this case a doubly structured parallelogram linkage A. Via adjacent members 6 and rotary joints 7 it is swivel-connected to an opposite base member 8, which itself is rigidly connected to a machine bed 9 or a work spindle housing 10.

By means of hydraulically, pneumatically or electric motor driven swivel drive 11, the movable part of the parallelogram linkage A comprising the holder 5 and the members 6 can be swivelled through a fixed given angle from stop to stop. The swivel plane of the parallelogram linkage A lies preferably parallel to the rotary axis 16 of a workpiece 14, or coincides with the same.

In a top end position, which corresponds with the measuring position, the active end face 2 of the measuring probe 1 in its measuring position is located immediately on the outer contour of the workpiece teeth 13 to be measured out. This is effected in that when re-setting the machine for a new workpiece 14 the measuring probe 1 is brought into and clamped in the desired position by axially shifting the probe 1 in holder column 3 and by shifting, at right angles to this, the holder column 3 in the holder 5.

In the lower end position depicted in FIG. 2, which corresponds with the position of rest, the measuring probe 1 is located in a retracted position protected against soiling outside the working area, where it hampers neither the subsequent machining process nor the access of the loading device for loading the work spindle with a new workpiece 14.

Thanks to the structural design of the parallelogram linkage A as double parallelogram with two non-clearance pre-loaded roller bearings 7 per swivel axis, between which the spacing is at least equal to the length of the shorter parallelogram members, the aligning device according to the invention possesses alongside a high positioning accuracy also a high static stiffness and robustness against inadvertent touch. On account of the relatively small moving masses, the measuring probe is hardly prone to vibration in its measuring position, and can nevertheless be moved very quickly.

The observance of a high positioning accuracy is especially ensured in that the advance of the measuring probe 1 to the top end position is devoid of any motion tangential to the workpiece circumference, and in that thermal influence is reduced to a minimum by the symmetrical construction.

The working area of gear finishing machines is especially exposed to the coolant/lubricant necessary for process cooling, and to soiling by grinding dust and swarf, which often leads to wear and functional disturbances in moving parts. In this sense the parallelogram kinematics employed here afford particular advantages, in that it only requires rotational joints, which experience has shown to be easier to protect against soiling than every other form of guidance, such as probes that are advanced in linear fashion on a rod.

LIST OF REFERENCE NUMBERS

1 Measuring probe
2 Active end face
3 Holder column
4 Probe axis
5 Holder
6 Adjacent parallelogram member
7 Rotary joint
8 Base member
9 Machine bed
10 Work spindle housing
11 Swivel drive
13 Workpiece teeth
14 Workpiece
16 Rotary axis
17 Work spindle
A Parallelogram linkage

What is claimed is:

1. Device for the non-contact measurement of the position of the teeth of a workpiece with pre-cut teeth, which is set up for fine machining on the work spindle of a gear finishing machine, said work spindle being rotatable about a rotary axis and said gear finishing machine having a machine bed, said device comprising:
   a retractable measuring probe, which is moveable in a fixed swivel plane between a first fixed measuring position and a second fixed retracted position, said swivel plane being parallel to or coinciding with said rotary axis;
   a double parallelogram linkage that comprises two parallelogram linkages between which said swivel plane is disposed, said two parallelogram linkages having identical swivel axes perpendicular to said swivel plane and being connected to move synchronously with one another, and said double parallelogram linkage having first and second ends;
   a holder carrying said probe, said holder being arranged between and connecting said two parallelogram linkages at the first end of said double parallelogram linkage, such that said probe is protected by said two parallelogram linkages when being in said second fixed retracted position; and
   a base member opposite said holder, said base member being rigidly connected to the machine bed or a work spindle housing, said base member being arranged between and connecting said parallelogram linkages at the second end of said double parallelogram linkage.

2. Device according to claim 1, wherein the holder is swivellable through a fixed given angle from stop to stop.

3. Device according to claim 1, wherein a rotary drive is provided for the swivelling of the holder, operated hydraulically, pneumatically or by electric motor.

4. Device according to claim 1, wherein the rotary joints of the parallelogram linkage consist of non-clearance pre-loaded roller bearings.

5. Device according to claim 1, wherein the parallelogram linkage possesses two rotary joints for each swivel axis, the distance between which corresponds at least with the length of the shorter parallelogram members.

6. Device according to claim 1, wherein the measuring probe is arranged for displacement and clamping parallel to its axis.

7. Device according to claim 1, wherein the holder is swivel-connected to the base member via members and rotary joints.

8. Device according to claim 1, wherein the measuring probe is arranged in a holder column for displacement and clamping at right angles to its axis.

9. Device according to claim 8, wherein the holder column is arranged for displacement and clamping in the holder at right angles to the axis of the measuring probe.

\* \* \* \* \*